US008549524B2

(12) United States Patent
Jula

(10) Patent No.: US 8,549,524 B2
(45) Date of Patent: Oct. 1, 2013

(54) TASK SCHEDULER FOR COOPERATIVE TASKS AND THREADS FOR MULTIPROCESSORS AND MULTICORE SYSTEMS

(75) Inventor: Alin N. Jula, Mountain View, CA (US)

(73) Assignee: SAP AG, Walldorf (DE)

(*) Notice: Subject to any disclaimer, the term of this patent is extended or adjusted under 35 U.S.C. 154(b) by 582 days.

(21) Appl. No.: 12/646,313

(22) Filed: Dec. 23, 2009

(65) Prior Publication Data

US 2011/0154346 A1    Jun. 23, 2011

(51) Int. Cl.
*G06F 9/46*    (2006.01)
(52) U.S. Cl.
USPC ........... 718/102; 718/100; 718/101; 718/103; 718/106
(58) Field of Classification Search
None
See application file for complete search history.

(56) References Cited

U.S. PATENT DOCUMENTS

2007/0220517 A1* 9/2007 Lippett ........................ 718/102
2009/0031317 A1* 1/2009 Gopalan et al. ............... 718/103

OTHER PUBLICATIONS

Calandrino et al. Soft Real-Time Scheduling on Performance Asymmetric Multicore Platforms. [online] (Apr. 6, 2007). IEEE, pp. 1-10. Retrieved From the Internet <http://citeseerx.ist.psu.edu/viewdoc/download?doi=10.1.1.117.3299&rep=repl&type=pdf>.*
Arora, Nimar S. et al.: Thread Scheduling for Multiprogrammed Multiprocessors; ACM Symposium on Parallel Algorithms and Architectures; Proceedings of the 10th Annual ACM Symposium on Parallel Algorithms and Architectures; Puerto Vallarta, MX; pp. 119-129; 1998; ISBN: 0-89791-989-0.
Blumofe, Robert D. et al.: Scheduling Multithreaded Computations by Work Stealing; Journal of the ACM (JACM); vol. 46, Issue 5; Sep. 1999; pp. 720-748; ISSN: 0004-5411.
Chase, David et al.: Dynamic Circular Work-Stealing Deque; ACM Symposium on Parallel Algorithms and Architectures; Proceedings of the 17th Annual ACM Symposium on Parallelism in Algorithms and Architectures; Las Vegas, NV; Session: Queuing and Scheduling; pp. 21-28; 2005; ISBN:1-58113-986-1.
Hendler, Danny et al.: A Dynamic-Sized Nonblocking Work Stealing Deque; Distributed Computing; vol. 18, Issue 3; Feb. 2006; Special Issue: DISC 04; pp. 189-201; ISSN: 0178-2770.
Michael, Maged M.: Hazard pointers: Safe Memory Reclamation for Lock-Free Objects, IEEE Transactions on Parallel and Distributed Systems; vol. 15 Issue 6; Jun. 2004; pp. 491-504; ISSN: 1045-9219.
Acar, Umut A. et al.: The Data Locality of Work Stealing, ACM Symposium on Parallel Algorithms and Architectures; Proceedings of the 12th Annual ACM Symposium on Parallel Algorithms and Architectures; Bar Harbor, Maine; pp. 1-12; 2000; ISBN: 1-58113-185-2.

* cited by examiner

*Primary Examiner* — Emerson Puente
*Assistant Examiner* — Jonathan R Labud
(74) *Attorney, Agent, or Firm* — Blakely, Sokoloff, Taylor & Zafman LLP

(57) ABSTRACT

In a computer system with a multi-core processor, the execution of tasks is scheduled in that a first queue for new tasks and a second queue for suspended tasks are related to a first core, and a third queue for new tasks and a fourth queue for suspended tasks are related to a second core. The tasks have instructions, the new tasks are tasks where none of the instructions have been executed by any of the cores, and the suspended tasks are tasks where at least one of the instructions has been executed by any of the cores. New tasks are popped from the first queue to the first core; and in case the first queue being empty, tasks are popped to the first queue in the following preferential order: suspended tasks from the second queue, new task from the third queue, and new tasks from the fourth queue.

19 Claims, 13 Drawing Sheets

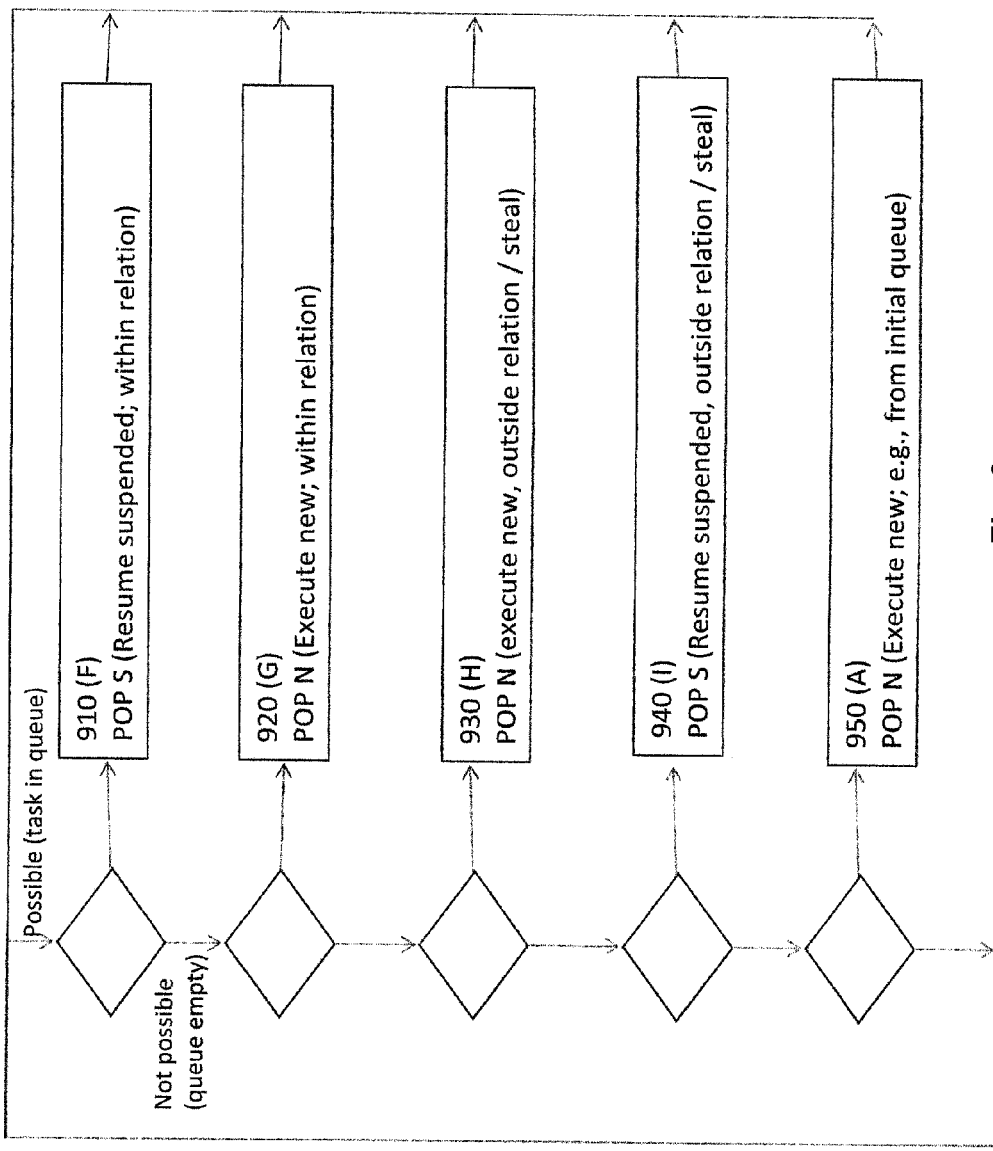
Fig. 9    POP OPERATION SELECTION

TASK SCHEDULER FOR COOPERATIVE TASKS AND THREADS FOR MULTIPROCESSORS AND MULTICORE SYSTEMS

FIELD

The description generally refers to computers, and more in particular refers to computers with multiple processors or multiple cores (so-called multicore computers).

BACKGROUND

Computers can be considered as combinations of hardware and software components. Computers perform applications to the benefit of human users. For example, computers perform business applications to support business processes in enterprises.

Hardware components are, for example, processors, storage memory devices, random-access memory (RAM) and user interfaces. Software components are, for example, programs and operating systems. The programs are, for example, application programs for the mentioned applications; and operating systems are combinations of input-output drivers, schedulers, virtualization layer and so on.

In a simplified usage-scenario for a program, at design-time, a computer expert (i.e. a programmer) writes the program as a collection of tasks. At deployment-time, the expert deploys the program to the storage memory. At run-time, the processor copies the program to its RAM memory and executes the tasks. The order in which the processor executes the tasks is not statically available at design time; rather, the order develops dynamically in response to, for example, input data, user interaction, or program conditions.

While the above basics remain true for most computers, modern computers can have processors with multiple processing units (e.g., multicore, multiple processors) that share the same RAM, so that some tasks can be executed in parallel. Distributing the tasks to the cores can be challenging: Operating the cores at approximately equal execution load conflicts with spending computation resources to balance the load.

SUMMARY

In one implementation, scheduling execution of tasks by a multi-core processor is performed. A first queue for new tasks and a second queue for suspended tasks are related to a first core, and a third queue for new tasks and a fourth queue for suspended tasks are related to a second core. The tasks have instructions, the new tasks being tasks where none of the instructions has been executed by any of the cores, and the suspended tasks being tasks where at least one of the instructions has been executed by any of the cores. The execution is scheduled as popping suspended tasks from the second queue to the first core for executing the suspended tasks; popping new tasks from the first queue to the first core for executing the new tasks; popping new tasks from the third queue to the first core for executing the new tasks; and popping suspended tasks from the fourth queue to the first core for executing the suspended tasks.

In one aspect, popping new tasks is performed with a preference of initial tasks.

In one aspect, popping a suspended task is performed with a preference of popping from the first and second queues that are related to the first core.

In one aspect, the execution of a suspended task is resumed by the core that previously executed that at least one of the instructions of that suspended task.

In one aspect, performed by a multi-core processor wherein relations between queues and cores are affinity relations wherein execution resumption of suspended tasks has priority on the core that originally executed the tasks partly before suspension.

In one implementation, a computer is operated with a first processing core and a second processing core, performing a method of executing initial tasks by the cores; preparing new tasks by the cores; executing new tasks and suspended tasks by the cores; and selecting new and suspended tasks for executing by the core, for the first processing core, the new and suspended tasks are executed in a preference order that prioritizes the suspended tasks over new tasks from queues related to the first processing core, and that further prioritizes new tasks over suspended tasks from queues related to the second processing core.

In one aspect, the selecting operation is performed with task affinity to the processing core that was executing a task prior to suspending it.

In one aspect, queues related to the first processing core include tasks scheduled by an associated scheduler that only schedules the tasks in the queues associated with the first processing core, wherein queues related to the second processing core include tasks scheduled by an associated scheduler that only schedules the tasks in the queues associated with the second processing core, wherein a scheduler assigns tasks to its associated processing core from a non-associated queue if the associated queue does not have a task for the processing core to execute.

In one implementation, scheduling execution of tasks by computer resources is performed. A first queue for tasks of a first type and a second queue for tasks of a second type are related to a first resource, wherein a third queue for tasks of the first type and a fourth queue for tasks of the second type are related to a second resource. The tasks have instructions, wherein the tasks of the first type have instructions that have not yet been executed by any of the resources and wherein the tasks of the second type have instructions for that at least one instruction has already been executed by any of the resources. The scheduling execution includes checking the availability of tasks in the queues; and popping tasks to the first resource, in dependency of the availability to pop tasks of the second type from the first queue, to pop tasks of the first type from the first queue, to pop tasks of the first type from the third queue, and to pop tasks of the second type from the fourth queue.

In one aspect, the tasks are popped in preference of tasks of the second type over the first type for tasks from the second and first queues, and in preference of tasks of the first type over the second type for tasks from the third and fourth queues, respectively.

In one implementation, a method for scheduling execution of tasks by computer resources includes a first operation, popping tasks to a first resource from first and second queues that are in relation to the first resource, with preference of suspended tasks over new tasks. The first queue for tasks of a first type and the second queue for tasks of a second type are related to the first resource, and tasks of the first and second queues are scheduled for processing by the first resource, the tasks having instructions, wherein the tasks of the first type have only instructions that have not yet been executed a resource and wherein the tasks of the second type have at least one instruction that has already been executed by a resource. A second operation, popping tasks to the first resource from a third and fourth queues that are not in relation to the first resource, with inverse preference of new tasks over suspended tasks. The third queue for tasks of the first type and the fourth queue for tasks of the second type are related to a second resource, and tasks for the third and fourth queues are scheduled for processing by the second resource.

In one aspect, the second operation is performed when the first and second queues in the relation to the first resource are empty.

In one implementation, an apparatus with computational resources to execute tasks includes: a memory with queues wherein a first resource is related in a first relation to a first queue for new tasks and to a second queue for suspended tasks, and a second resource is related in a second relation to a third queue for new tasks and to a fourth queue for suspended tasks; and a scheduler to pop tasks from the queues for executing the tasks by the first and second resources, the scheduler to prioritize execution with suspended tasks having priority within the relations, and new tasks being allowed to be executed outside the relations.

In one aspect, the scheduler pops tasks to the resources with priority levels, the first level being the highest priority level, wherein the first resource executes suspended tasks from the second queue in the first relation at a first priority level; executes new tasks from the first queue in the first relation at a second priority level; executes new tasks from the third queue by stealing tasks from the second relation at a third priority level; and executes suspended tasks from the fourth queue by stealing tasks from the second relation at a fourth priority level.

In one aspect, the computational resources are processing cores.

In one aspect, the scheduler has separate instances that are assigned to the queues and cores.

In one aspect, the computational resources are processor cores and the tasks are threads.

In one implementation, a scheduler program is tangibly embodied on a computer-readable medium, and operates to allow multiple cores to execute initial tasks; allow the cores to generate new tasks; execute new tasks and suspended tasks; and select new and suspended tasks for execution for a first processing core, the new and suspended tasks to be executed in a preference order that prioritizes the suspended tasks over the new tasks from queues related to the first processing core, and that prioritizes new tasks over suspended tasks from queues related to the second processing core.

In one aspect, the scheduler program to have separate instances for the relations to the cores.

BRIEF DESCRIPTIONS OF THE FIGURES

The following description includes discussion of figures having illustrations given by way of example of implementations of embodiments. The figures should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 9 is a flow chart diagram of a preferential order to pop tasks;

DETAILED DESCRIPTION

The detailed description starts with an overview to arrangement and operation of an example embodiment of a computer (FIGS. 1-2), continues with details regarding queues, tasks and actions (FIGS. 3-5), gives an example program (FIG. 5), and looks at example actions to pop tasks from the queues (FIGS. 6-9). The description closes with a discussion of further embodiments (FIGS. 10-11).

In the context of the embodiment, a task is a series of computer instructions. Tasks can be executed as threads, processes, light-weight processes, or by any other software/hardware component that executes a series of instructions. The description closes with an introduction of further embodiments that apply the teachings to tasks that are portions of application programs, web-services, or virtual machines (i.e., tasks) running on processors.

Figure 1:
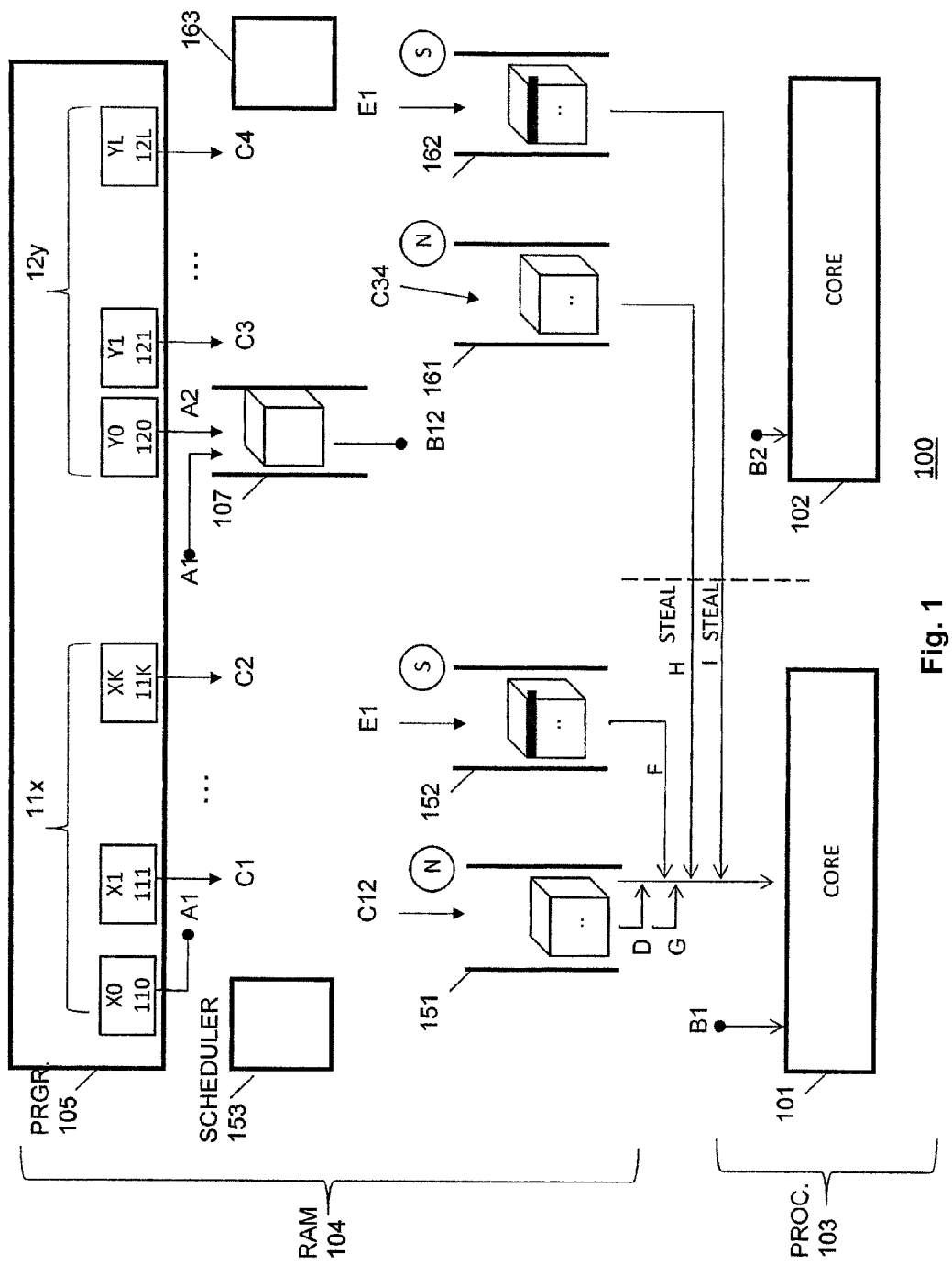
FIG. 1 is a block diagram of an example embodiment with a computer with a two-core processor that executes tasks.

FIG. 1 is a block diagram of a computer with a two-core processor that executes tasks.

Computer 100 has random access memory (RAM) 104 and processor 103. RAM 104 and processor 103 are communicatively coupled, for example, by a bus.

Processor 103 has one or more cores; each core can have a cache, and optionally can have its own memory. In the embodiment that is illustrated in the figure, processor 103 has first core 101 and second core 102, both cores sharing RAM 104.

RAM 104 has scheduler 153/163, program 105, and queues 107, 151, 152, 161, 162. The scheduler is responsible for coordinating the communication inside the RAM and to/from the core. It will be understood that a processor may include one or more cores; thus, communication can also be said to be to the processor. Thus, the scheduler provides instructions for execution to the core. For example, the scheduler triggers push/pop actions to/from the queues at time points that are determined by a scheduling algorithm. The scheduler is a support program that is also executed on one of the cores. It is convenient to implement the scheduler with separate instances that are assigned to the queues and cores, and that perform the algorithm in different instances for each core. In other words, each scheduler instance is a series of instructions to arrange execution of the tasks. The scheduler instances run the scheduling algorithm. In the example of FIG. 1, the scheduler has a first scheduler instance 153 and has a second scheduler instance 163.

Program 105 is illustrated with small rectangles that symbolize tasks 110, 111 ... 11K (collectively 11x) that stand for a number of (K+1) tasks in a first task group, and tasks 120, 121 ... 12L (collectively 12y) that stand for a number of (L+1) tasks in a second task group.

For convenience, the tasks are sometimes referred to as X0, X1 ... XK (first group, 110, 111 ... 11K) and Y0, Y1 ... YL (second group, 120, 121 ... 12L). The two tasks with index 0 (i.e., X0 and Y0) are called "initial tasks"; and the other tasks X1 to XK and Y1 to YL are called "new tasks".

The new tasks are generated at run-time during execution of a task, which could be an initial task or not. The new tasks are then nestedly created by other tasks being executed. In the first task group, the tasks X1 to XK are generated from initial task X0, and in the second task group, the tasks Y1 to YL are generated from initial task Y0.

The queues are illustrated by vertical parallel lines with inputs at the top (for pushing tasks) and with outputs at the bottom (for popping tasks). It will be understood that reference to the top, bottom, right, or left of this and the other figures is relative to the orientation of the drawings, and is made purely for didactic purposes. Reference to top, bottom, right, or left is not be understood as limiting. Tasks that are in a queue are illustrated by boxes. The queues are distinguished into "N-type" queues 151/161 and "S-type" queues 152/162. The types are also illustrated by N and S in circles. In short, the queues are referred to as "N-queues" and "S-queues". For queue 107 (the mentioned "initial queue") there is no N or S distinction made.

Illustrated on the left side, queues 151/152 and scheduler instance 153 form a first queue-scheduler-assignment 151/152/153; and on the right side, queues 161/162 and scheduler instance 163 form a second queue-scheduler-assignment 161/162/163. The direction of assignment does not matter: queues are assigned to the scheduler instances, and scheduler instances are assigned to queues. In other words, the assignment between the scheduler and the queues is associative.

Within the assignments, the cores have paired queues, i.e. an N-type queue and an S-type queue. In short (with more details to follow below), N-type queues are for new tasks that are not yet executed ("N-tasks"), and S-type queues are for suspended tasks ("S-tasks"), i.e. previously suspended tasks that are ready to be resumed. It will be understood that the assignments or relations of queues and schedulers indicates what scheduler will schedule tasks within a queue. In practice, the scheduler may have an indication such as an address or identifier of assigned queues, and thus have control to place tasks for execution within the assigned queue(s).

Task suspension occurs when a core has started executing the task and one of the instructions of the task instructs the task to stop its execution and to give control back to the scheduler. Task suspension usually happens within a synchronization mechanism such as a semaphore, but that is not required, a task can voluntarily return control back to the scheduler. When the task is ready to be resumed, the task is pushed to the S-queue.

In the example embodiment of FIG. 1, there are an equal number of schedulers and cores, but embodiments with more schedulers than cores are also possible (cf. FIG. 10).

There are also assignments from the schedulers (and queues that are assigned to them) to the cores, or vice versa from the cores to the schedulers. For convenience, these assignments are also referred to as "relations", or "affinity relations". Similar to what is described above with reference to assignments between schedulers and queues, assignments between schedulers and cores refers to an indication or assignment of which scheduler schedules tasks for which core.

Assignment 151/152/153 is related to its "own" core 101, and assignment 161/162/163 has its "own" core 102. Or, in other words, assignment 151/152/153 has an "other core" relation to core 102; and assignment 161/162/163 has that "other core" relation to core 101. Thus, scheduler 153 schedules tasks within queues 152/153 for execution by core 101. Scheduler 163 schedules tasks within queue 162/163 for execution by core 102. Scheduler 153 assigns tasks for core 101, and does not schedule tasks for execution by core 102. Similarly, scheduler 163 assigns tasks for core 102, and does not schedule tasks for execution by core 101. However, as is described herein, tasks scheduled by one scheduler for a related core may be reassigned to be executed by a non-related core. For example, a task placed in queue 161 by scheduler 163 may be executed by core 101 in certain circumstances.

Most of the communication within the RAM and between RAM and cores within a scheduler is to push tasks to queues and to pop tasks from queues. Direction and sequential order of such push/pop actions are illustrated by arrows with letters (A) (B) (C) (D) (E) (F) (G) (H) and (I). For convenience of explanation, the arrows for push actions (A) (C) (E) and for pop actions (B) (D) (F) (G) (H) (I) are drawn at the end points slightly differently. To keep the figure free of crossing arrows, the arrows can have indices and connection dots. For example, the arrow A1 goes from task X0/110 to queue 107. The arrows C1 and C2 go to queue 151, and the end of the arrows is illustrated simplified as a single arrow C12.

Figure 2A:
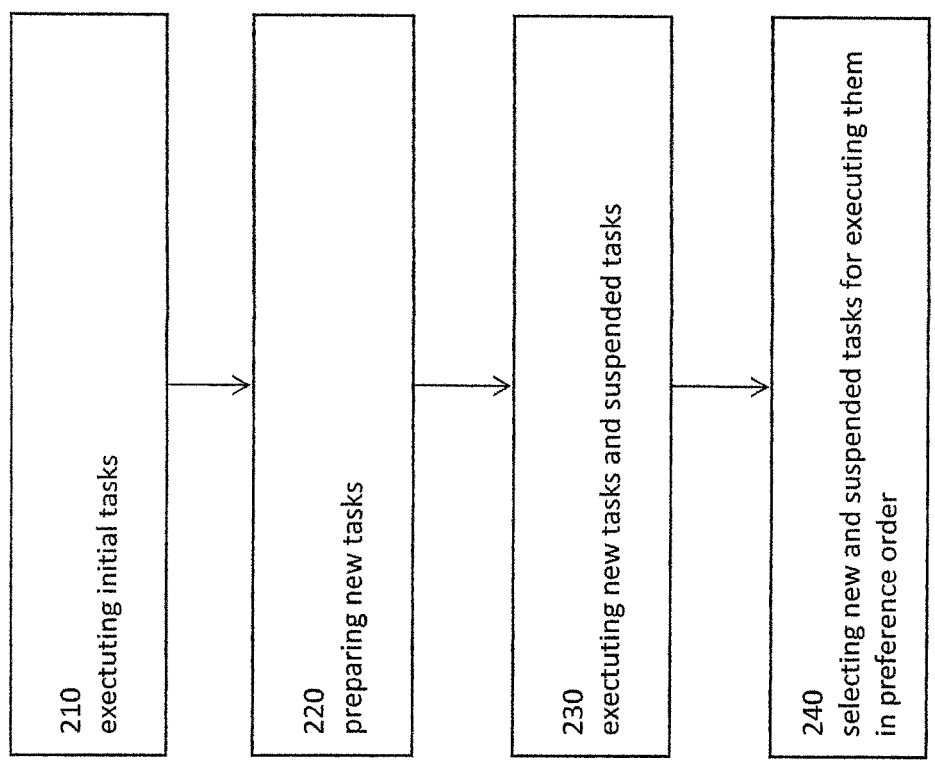
FIG. 2 is a flowchart diagram to further illustrate the operation of the computer.
Figure 2B:
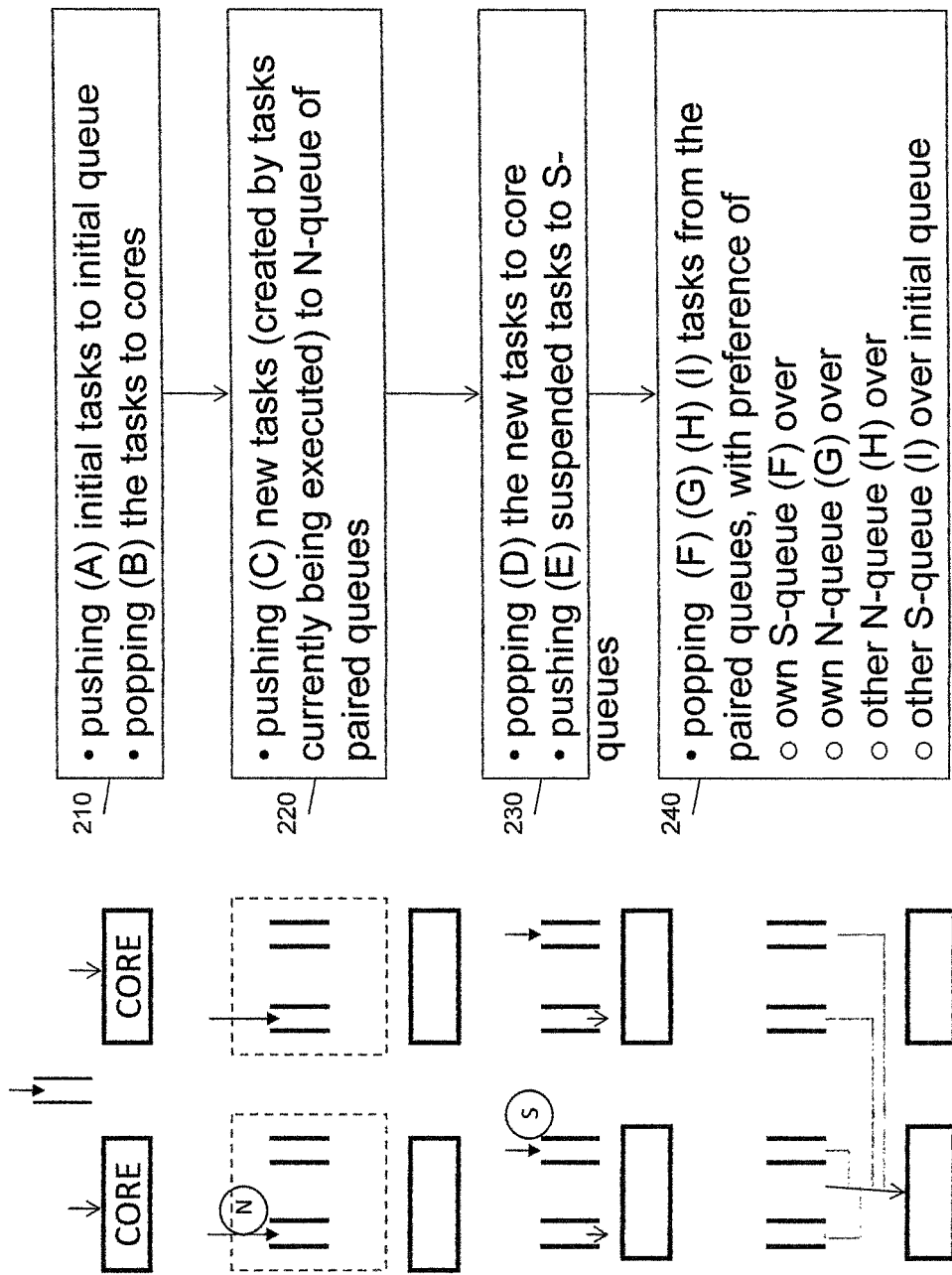

FIG. 2 is a flowchart diagram to further illustrate the operation of the computer. FIG. 2 has two versions: FIG. 2a is a flowchart that names the operations to give an overview; and FIG. 2b is a combination of a block diagram with queues and cores (left side) with a more detailed flowchart (right side).

In short (cf. FIG. 2a), the operation of the computer could be summarized as method 200 with the following operations: executing initial tasks 210, preparing new tasks 220, executing new tasks and suspended tasks 230, and selecting new and suspended tasks for executing them in a preference order 240. This distinction into method operations is just convenient for explanation; in a pipeline, most operations can be performed simultaneously. For example, at any point in time, the computer could pop tasks from the paired queues (240) and substantially simultaneously push new tasks in a queue (220). Or, looking at tasks, for example, at a first time point, a particular task is being pushed to a queue (C), and later, at a second time point, this task is being popped to a core (D).

The description now continues with more details (FIGS. 1/2b) and uses the (A) ... (I) letters and arrows.

To execute initial tasks (cf. operation 210), the scheduler pushes (A) initial tasks to initial queue 107, in the example of FIG. 1, the scheduler pushes (arrow A1) task X0/110 and pushes (arrow A2) task Y0/120. The scheduler then pops (B) the tasks to the cores, in the example, the scheduler pops task X0/110 to core 101 (arrow B1) and task Y0/120 to core 102 (arrow B2). Once a core has received a task, new or suspended, the core starts executing it.

While a processor executes a task it may generate a new task (N-task) that needs to be executed, for example, by instantiating the new task. Deriving tasks (e.g., new tasks) from existing tasks (e.g., from the initial tasks) is further explained by an example below in connection with FIGS. 4-5. In the example of FIG. 1, task X0/110 has identified X1/111 as its new task; and task Y0/120 has identified task Y1/121 as its new task. As used herein, tasks with "higher" indices, like XK/11K and YL/12L are tasks that are "new" with respect to tasks with "lower" indices X1/111 and Y1/121.

To generate new tasks (cf. operation 220) for execution, the scheduler pushes (C) the new tasks (N-tasks) to the N-queues of the paired queues. In the example of FIG. 1, the scheduler (i.e. instance 153) pushes (C1) task X1/111 to N-queue 151 of paired queue 151/152; and the scheduler (i.e., instance 163) pushes (C3) task Y1/121 to N-queue 161 of paired queue 161/162. During further operation of the computer, the scheduler keeps pushing N-tasks to the N-queues (C2, C4)

To execute new tasks and suspended tasks (cf. operation 230), the scheduler pops (D) the new tasks to the cores, and pushes (E) suspended tasks to the S-queues. In the example of FIG. 1, the scheduler (instance 153) pops N-tasks from N-queue 151 to core 101 (arrow D), and the scheduler (instance 163) pops N-tasks from N-queue 161 to core 102 (no arrow drawn to keep the figure simple). Similarly, the scheduler (instance 153) pops S-tasks (i.e., tasks for that execution is suspended) from the S-queue. A task (either new or suspended) can suspend itself, in which case the tasks get pushed to S-queues 152 and 162 (arrows E1, E2).

To select new and suspended tasks for executing them in a preference order (cf. operation 240), the scheduler pops tasks from the paired queues, with preference of the "own" S-queue (F) over the "own" N-queue (G) over the "other" N-queue (H) over the "other" S-queue (I), and over the initial queue (initial task). A slightly different order could also be used: F, G, I, H, and then the task from the initial queue. Similarly, G, F, I, H and then the initial queue, or G, F, H, I and then the initial queue.

The terms "own" and "other" are short terms to indicate the above-mentioned relation of queue-scheduler-assignments to the cores. An example is explained for core 101. In the queue-scheduler-assignment 151/152/153 (as illustrated on the left side), the queues 151/152 are the "own" queues for core 101. Queues 161/162 belong to the "other" core 102 (as illustrated on the right side). In that case, the scheduler (instance 153) checks if (arrow F) the "own" S-queue 152 has S-tasks and pops them if possible. If not possible, the scheduler checks for N-tasks in the "own" 151 queue (arrow G). If that is not possible, the scheduler checks for tasks in the "other" queues 161/162, in a sense this is "stealing", with a preference to pop N-tasks (N-queue 161) over S-tasks (S-queue 162). The last preference is that of an initial task that might be still in the initial queue.

The principle to prefer tasks from "own" or associated queues over tasks from "other" queues is also applicable for the other core. In that case, in queue-scheduler-assignment 161/162/102, queues 161/162 would be the "own" queues, and queues 151/152 would be the "other" queues.

In other words, the execution of a suspended task is generally resumed by the core that previously executed at least one of the instructions of the suspended task. An example of when the suspended task is not resumed by the core that previously executed at least one of its instructions is in the case that the suspended task was stolen or popped by a different core. Thus, in the multi-core processor (101/102), the relations between queues and cores are affinity relations so that execution resumption of suspended tasks has priority on cores that originally executed the tasks partly before suspension. When a suspended task is pushed into an S-queue, by either the synchronization mechanism or by voluntary suspension, the S-queue that is selected belongs to the scheduler on which the task was being executed before its suspension, regardless of where the code that is pushing the task in the S-queue is being executed. For example, a task that was being executed on core 102 before the core suspended it, could be pushed back into the S-queue of core 102 even if the code that is doing the pushing is being executed in core 101.

Figure 3:
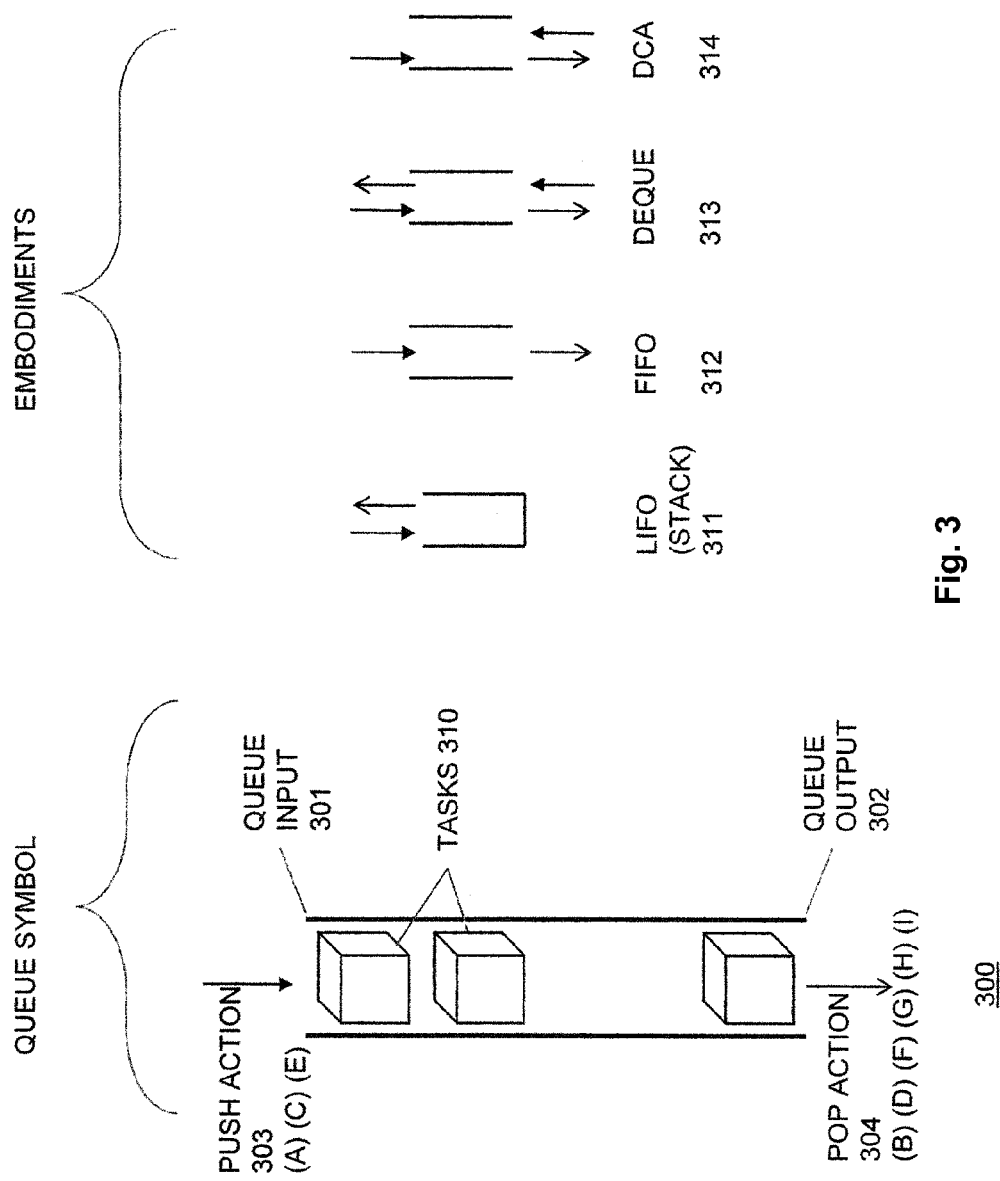
FIG. 3 is block diagram that illustrates task queues and distinguishes push actions and pop actions.

FIG. 3 is block diagram that illustrates task queues and distinguishes push actions and pop actions. On the left of the figure, there are parallel lines that symbolize a queue; on the right side of the figure there are example embodiments.

Queue 300 has queue input 301 to receive tasks 310 in push action 303, for example as described under (A)(C)(E), to receive one or more tasks. The queue has queue output 302 for pop action 304, cf. (B)(D)(F)(G)(H)(I), to release a task for executing by a core. The arrows for push/pop actions are different; arrows for "push" point to queue inputs, and arrows for "pop" go away from queue outputs.

In the example embodiment, the queues can be implemented, for example, as LIFO (or "stack") 311 with one end functioning as input and output; as FIFO 312 with one end as input, the other at output; as double-ended queue (or "DEQUE") 313 with input/output at both ends; or as DCA 314 with an input at one end and with input/output at the other end. At a DCA (or dynamic circular array), the design to keep one end as input-only is convenient for performance reasons.

The example embodiments provide that tasks do not block (or stop) each other while in a queue.

The example embodiment allows concurrent access when multiple cores can access the same operation. For example, in the embodiment of FIG. 1, both N-queue and S-queue allow both core 101 and 102 to pop tasks in a parallel fashion. Allowing parallel access to these two queues when needed can be implemented, for example, by using a lock for atomic popping and pushing, or using non-blocking queue implementations.

As a person of skill in the art knows, queues can be implemented by other data structures that allow insertion for pushing and deletion for popping, for example, by hash tables.

Figure 4:
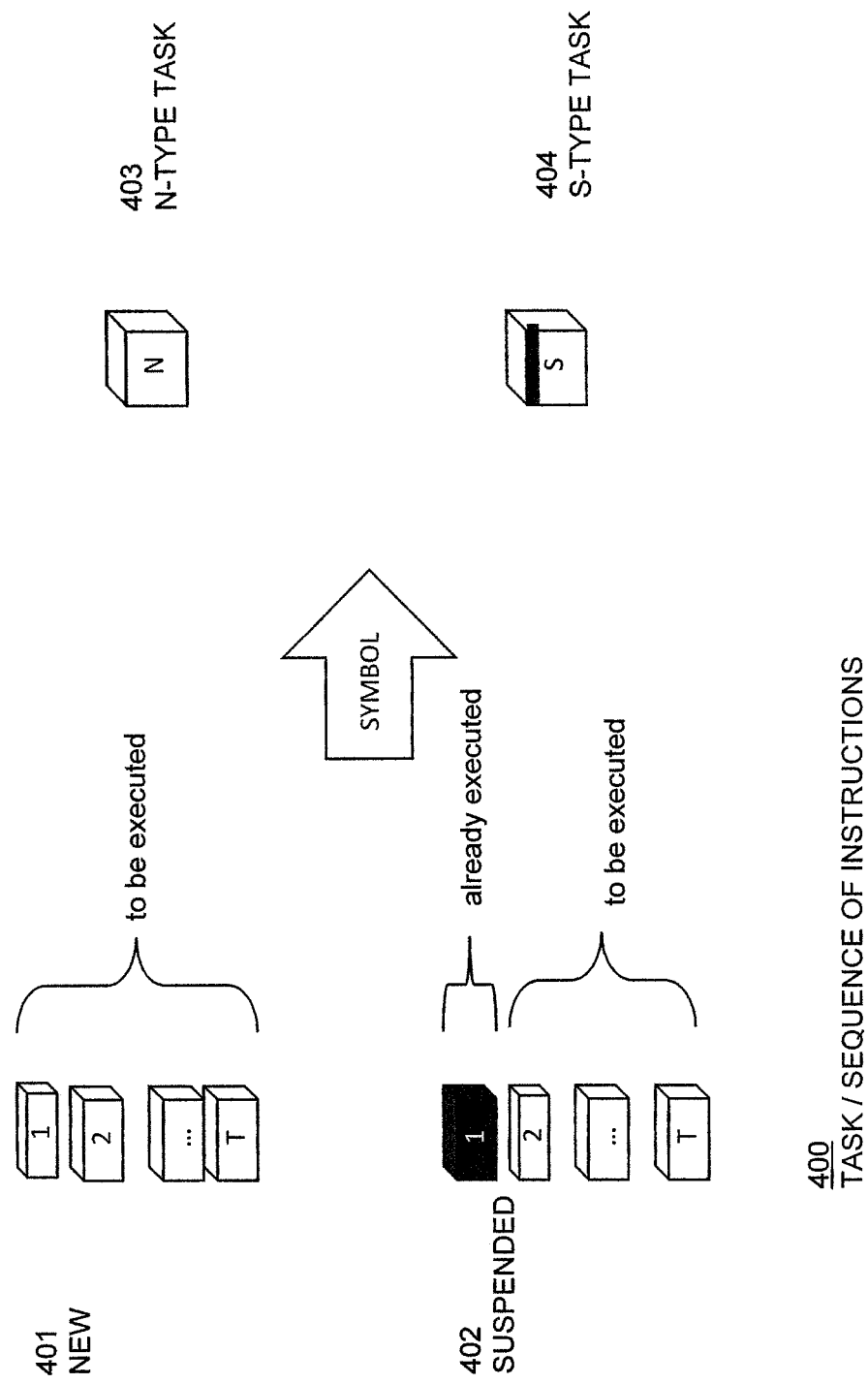
FIG. 4 is a block diagram that illustrates tasks as sets of instructions and distinguishes new tasks to be executed (N-task) and suspended tasks that are ready to be resumed (S-tasks)

FIG. 4 is a block diagram that illustrates tasks as sets of instructions and distinguishes new tasks to be executed (N-task) from suspended tasks (S-tasks).

A task 400 (cf. the tasks in the other figures) can be considered as a sequence of instructions for execution by the processor. On the left side, the figure symbolizes the instructions by small slices, having indices from 1 to T. The indices indicate a preferred execution order. On the right side, the figure symbolizes the tasks by cubes. The number T of instructions per task does not matter, in other words, there are tasks with more and with less instructions.

A task for which none of its instructions has been executed, is a new task, or N-task. In other words, an N-task is a task for which all instructions are still to be executed. As already mentioned in connection with FIG. 1, such N-tasks are usually buffered in the N-queues when they are generated by tasks that are already being executed, or by tasks in the initial queue (created by program 105).

A task for which at least one of the instructions has been executed and which has one or more instructions that are not yet executed, is a suspended task, or S-task. Such S-tasks are usually buffered in the S-queues. The figure illustrates a suspended task by filling the already executed instruction in black.

The distinction into N-tasks and S-task is not static: An N-task can be suspended and can become an S-task. Tasks for which all instructions are already executed do not have to be stored in queues, so that such tasks are not considered here.

Figure 5:
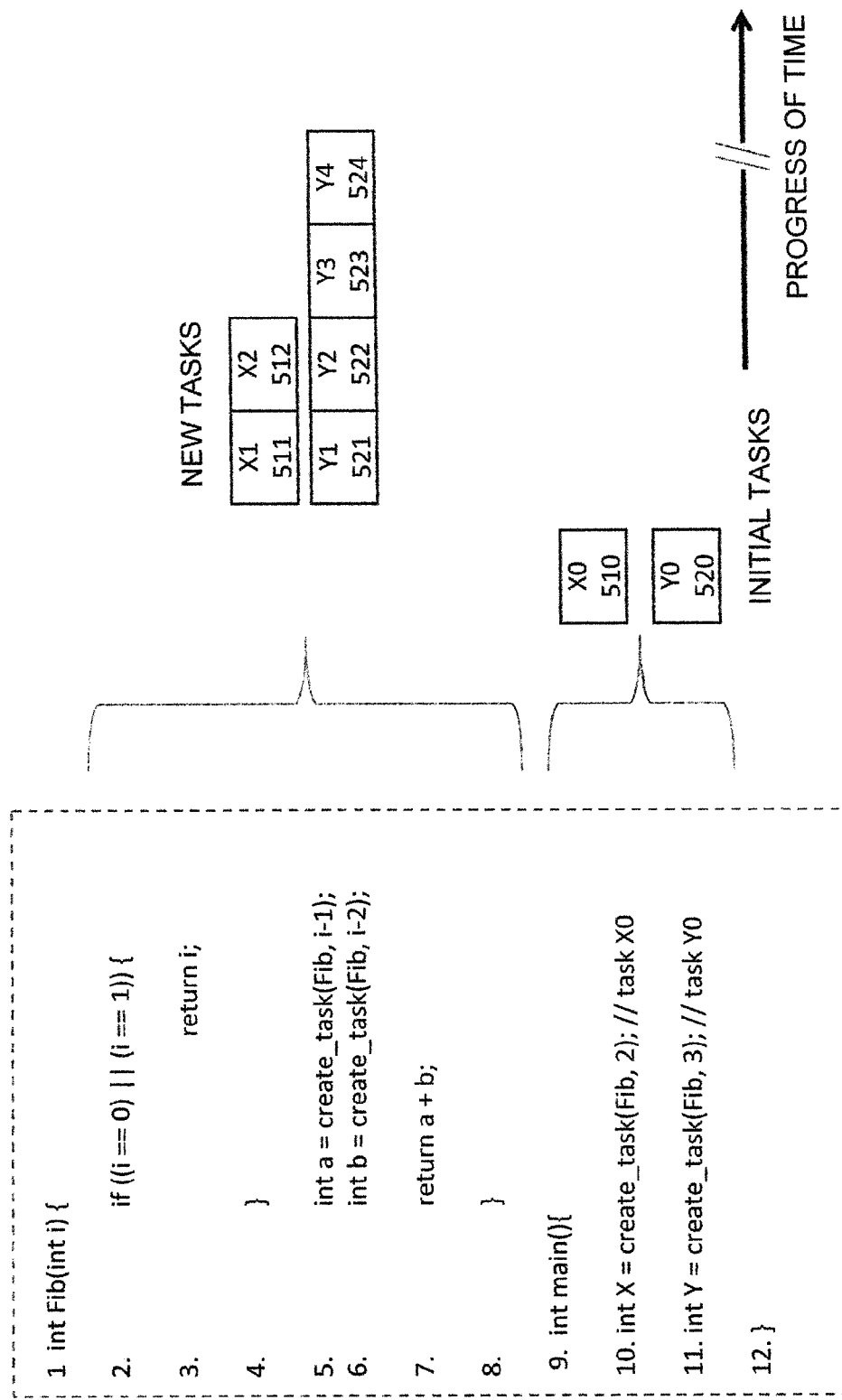
FIG. 5 is an example program listing in combination with a block diagram to illustrate the generation of new tasks.

FIG. 5 is an example program listing in combination with a block diagram to illustrate the generation of new tasks.

By way of example, program 505 is a program that calculates the Fibonacci numbers. Fibonacci numbers form a series of integer numbers 0, 1, 1, 2, 3, 5, 8 and so on. Using indices "i", the series can be expressed as Fib 0=0, Fib 1=1, Fib 2=1, Fib 3=2, Fib 4=3, Fib 5=5 and so on. For indices "i" larger than 1, the Fibonacci number are calculated by the recursive formula Fib i=Fib (i−1)+Fib (i−2).

Looking at the left side of the figure, program 505 uses this recursive formula and thereby creates new tasks. More in detail, the program has a function portion with the recursive formula (program line 5-7; and with small index "i" exception in program lines 2-3) and has a main portion (program lines 10-11) to calculate the particular Fibonacci numbers Fib 2 and Fib 3.

Program 505 is illustrated in source code (e.g., programming language C). It could be loaded to as program 105 (cf. FIG. 1) in that source code form, and executed with the help of a compiler or interpreter, or program 505 could be loaded as program 105 in binary code. In any form, source or binary, during operation of the computer, the program portions are instantiated as tasks.

Looking at the right side of the figure, the tasks are symbolized by rectangles (cf. FIG. 1). Tasks X0/510 and Y0/520 are the initial tasks (main portion), and tasks X1/511, X2/512 and Y1/521, Y2/522, Y3/523, Y4/524 are the new tasks. The progress of time is illustrated by an arrow going to the right. There are two main task groups: the first group (X-group) to calculate Fib 2 and the second group (Y-group) to calculate Fib 3.

There is a preference to execute tasks of group 1 on core 101, and to execute tasks of group 2 on core 102 (cf. FIG. 1).

By way of example, looking at the new tasks in the X-group, the core executes the initial task to calculate Fib 2 and thereby creates the new tasks to calculate Fib 1 (task X1/511) and Fib 0 (task X1/512). There are (K+1)=3 tasks: initial task X0/510 to calculate Fib 2, new task X1/511 to calculate Fib 1 and new task X2/512 to calculate Fib 0.

By way of example, looking at the new tasks in the Y-group, the core starts executing initial task 520 to obtain Fib 3 and thereby initiates new task 521 to calculate Fib 2 and new task 522 to calculate Fib 1.

In further recursions, task 521 (Fib 2) initiates task 523 (Fib 1) and task 524 (Fib 0). Tasks 522 (Fib 1), 523 (Fib 1) and 524 (Fib 0) do not call new tasks and return the results Fib 1=1 and Fib 0=0.

As mentioned above, the scheduler pushes the tasks to the N-queues and pops the task to the cores as explained above. Having explained how new tasks are being created and queued, the description now continues with a short discussion regarding suspended tasks (S-tasks).

A task can get suspended when it executes an instruction that suspends the task and gives control back to the scheduler. This instruction that suspends a task can be either explicitly in the task's list of instructions or in the list of instructions of an external function that the task calls. The following table gives an example program that uses a semaphore, with text following the // being comment. The semaphore's implementation of "wait" (line 4) suspends the tasks currently being executed and gives control back to the scheduler if the semaphore does not have available entries.

(line 1) semaphore s(1); // counting semaphore, shared by tasks
(line 2) void alpha( )    {
(line 3) ... // code alpha-1
(line 4) wait(s);
(line 5) ... // code alpha-2
(line 6) signal(s);
(line 7) ... // code alpha-3   }
(line 8) int main( )    {
(line 9) create_task(alpha); // Task A
(line 10) create_task(alpha);// Task B    }
(line 11) end code In the embodiment, the semaphore gets its own queue allocated. Two initial tasks are created: task A (line 9) and task B (line 10). The initial tasks correspond, for example, to the initial tasks X0/110 and Y0/120 (cf. FIG. 1).

Both tasks A and B execute the same function alpha. Assume that core 101 starts executing task A and core 102 starts executing task B, and further assume that task A reaches the "wait" on semaphore s earlier then task B. Reaching the semaphore earlier, task A takes the only available entry in the semaphore (while executing "wait" in line 4), and forces task B to wait until task A releases the semaphore by calling the "signal" function in line 6.

When task B reaches line 4 and starts executing "wait", the implementation of "wait" notices that the only available entry in the semaphore was already taken by task A, and therefore pushes the task B in the semaphore's queue. Once task B gets queued in the semaphore, the control is given back to the scheduler instance 163 for core 102. Instance 163 is now free to select any task to be executed, so that instance 163 further performs the above explained scheduling algorithm (cf. FIG. 9 as well). Task B is not yet in any of the scheduler's queues and therefore the execution of task B can not be resumed yet.

While waiting for task A to release the semaphore's entry, task B is queued in the semaphore's own queue. When task A reaches line 6 and starts executing "signal", the implementation of "signal" notices that task B is suspended in the semaphore's queue, waiting for an available entry in the semaphore. Task B is then pushed by "signal" to the S-queue on the same queue-scheduler-assignment from where its execution originally started, which is scheduler instance 163 and core 102, satisfying the task affinity mentioned above.

Once task B has been pushed to the S-queue 162 that is related to core 102, the function "signal" in task A completes. Once task B has been pushed to S-queue 162, it becomes ready to be resumed by either scheduler instances 153 or 163. Upon resuming, task B starts from the instruction it got suspended while being executed, that is "wait" in line 4. This is an example in that task B gets suspended and then pushed to the S-queue when the semaphore has become available. Task B is now ready to be resumed in execution.

The example embodiment uses a semaphore as a synchronization mechanism, but for informing possibility or non-possibility to resume execution can be implemented otherwise.

The description now explains the core selection for pushing the suspended task.

Assume that task A is being executed on core 101 and task B had been executed on core 102 before it got suspended in the semaphore's queue. The semaphore "signal" function being executed in task A causes task B to be inserted or pushed back to the S-queue on the core on which task B was originally executed, i.e. core 102. The "signal" will put task B back to the S queue 162 of core 102, despite the fact that "signal" is currently being executed in task A on core 101.

This is referred to as "task affinity", in other words, suspended tasks are being pushed to S-queue assigned to the same scheduler that initially started executing them. Task affinity helps data locality: when tasks are resumed for execution, the core may have data in the cache that could be reused.

After task A finishes executing the "signal" function (line 9), task A proceeds to line 7 without interruption. In the embodiment, task A does not get suspended. Task A wakes up an already suspended task waiting for the semaphore to indicate "resumption possible". Once task A is pushed to the suspended queue of core 102, the task becomes available for selection (popping). Once task B is resumed, task B is executed from the instructions from where is had been suspended (i.e. line 4). Thus, the next instruction that is to be executed once task B is resumed are the instructions in line 4.

The description now continues with a detailed discussion on how the embodiment pops the task to the cores.

Figure 6:
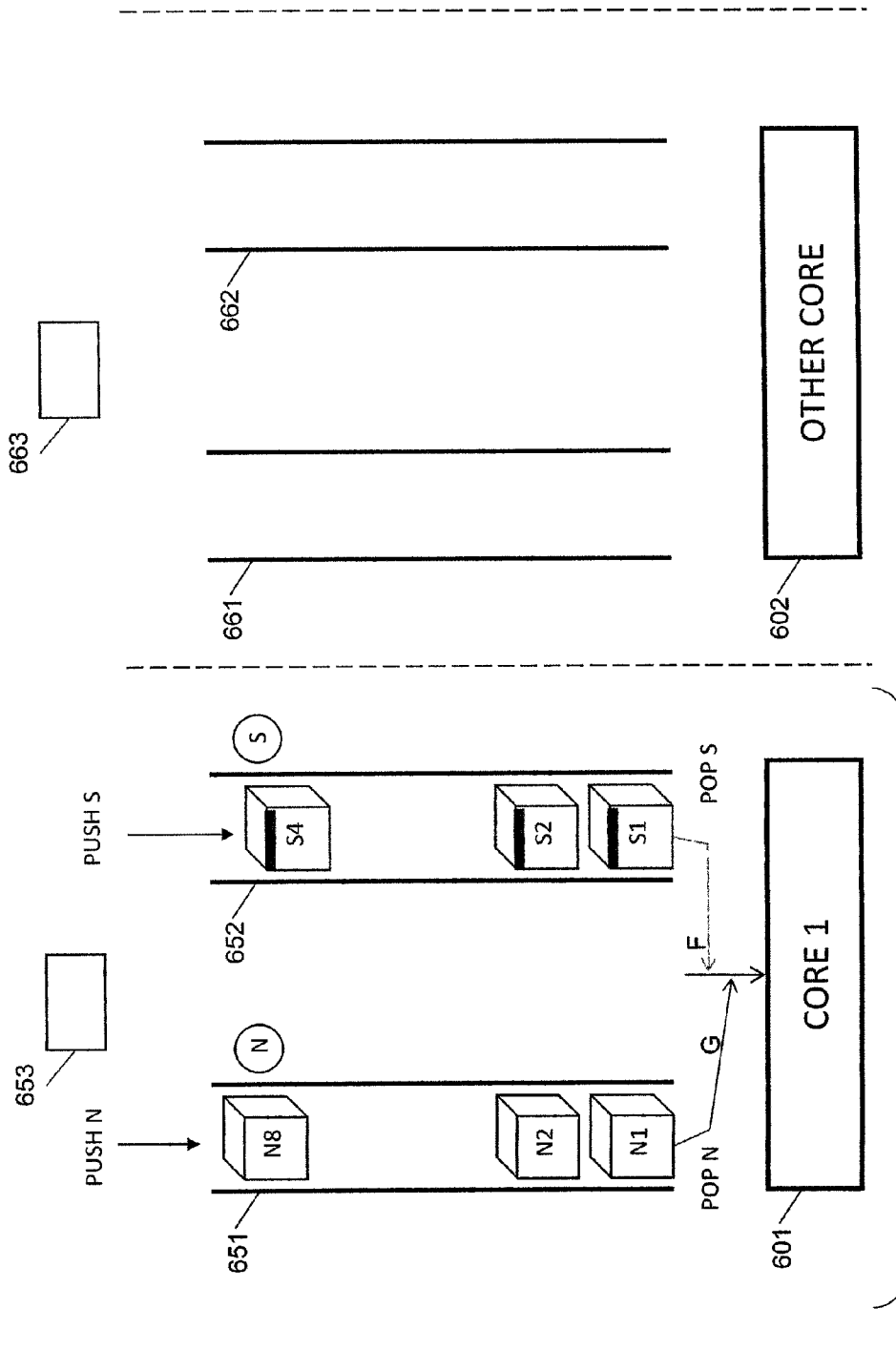
FIG. 6 is a block diagram of paired queues for N-tasks and for S-tasks to illustrate task execution by popping tasks within a queue-scheduler-assignment.
Figure 7:
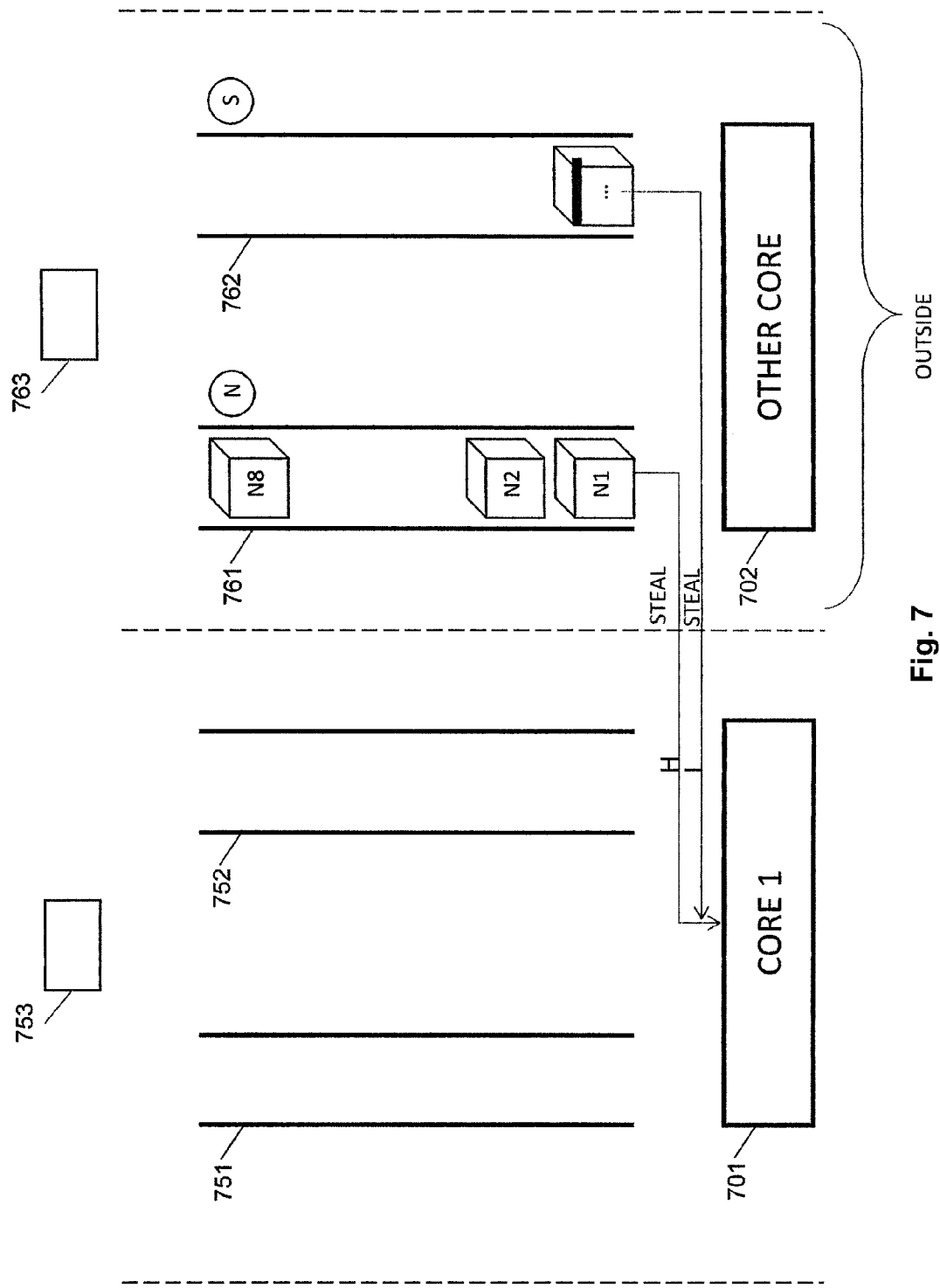
FIG. 7 is a block diagram of paired queues for N-tasks and S-tasks to illustrate task execution by popping tasks from outside a queue-scheduler-assignment.
Figure 8:
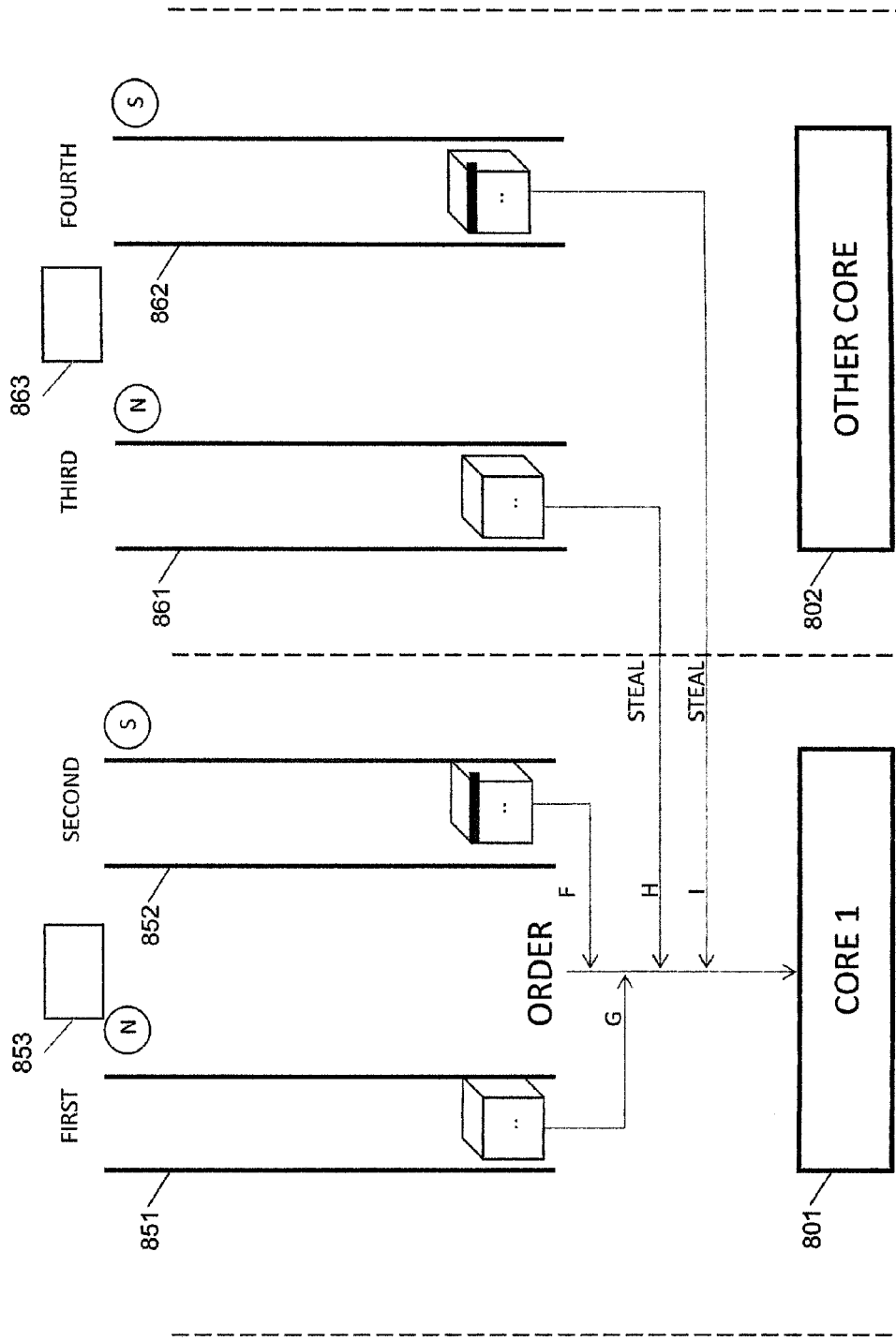
FIG. 8 is a block diagram of paired queues for N-tasks and S-tasks to illustrate task execution with a preferential order to pop tasks within and from outside the queue-scheduler-assignments.

FIGS. 6-8 are block diagrams of paired queues for N-tasks and for S-tasks to illustrate task execution by popping tasks to the cores.

The figures illustrate queues by parallel lines, tasks by cubes, cores and scheduler instances by rectangles, and push/pop actions by arrows. Each figure has a vertical dashed line in its center to illustrate the difference between the first queue-scheduler-assignment (on the left) and the second queue-scheduler-assignment (on the right). For convenience (similar to FIG. 2), the explanation of the scheduling algorithm (to pop tasks) concentrates on the core of the first assignment (CORE 1, left side). Pop actions for arrows that cross the dashed line are "stealing" actions (popping from "other" queues) to be executed on their "own" core.

The figures use similar reference numbers for the same elements, for example, references 601, 701 and 801 refer to the same CORE 1.

More in detail, there are first queue-scheduler-assignments 651/652/653 (likewise: 751/752/753, 851/852/853) and second queue-scheduler-assignments 661/662/663 (761/762/763, 861/862/863). The queues are paired with N-queue 651/751/851 in the first assignment, N-queue 661/761/861 in the second assignment, S-queue 652/752/852 in the first assignment, and S-queue 662/762/862 in the second assignment. Core 601/701/801 is CORE 1; and core 602/702/802 is the second (OTHER) CORE.

There are also relations, between the first queue-schedule-assignments and the first core, and between the second queue-schedule-assignment and the second core.

More in particular, FIG. 6 is a block diagram of paired queues for N-tasks and for S-tasks to illustrate task execution by popping tasks within a queue-scheduler-assignment. In other words, the tasks are in the queues that are related to the core, for the example, there are 8 N-tasks waiting in N-queue 651, and 4 S-tasks waiting in S-queue 652. Arrows F and G indicate the preference that the execution of suspended tasks (S-tasks) has priority over N-tasks. For suspended tasks, the core may have data in the cache that could be reused when the core resumes execution.

More in particular, FIG. 7 is a block diagram of paired queues for N-tasks and S-tasks to illustrate task execution by popping tasks from outside a queue-scheduler-assignment. Queue-scheduler-assignments or relations are illustrated by the vertical dashed lines. The queues in the first assignment (751/752/701) are empty, so that pop actions with that first assignment are not possible. However, the queues in the other core do have tasks, so that core 701 pops (i.e. steals) tasks from the other assignment 761/762/702 as indicated by arrows H and I. There is an inverse preference of N-tasks over S-tasks. This is different to the popping tasks with the own assignment (cf. FIG. 6, S over N).

More in particular, FIG. 8 is a block diagram of paired queues for N-tasks and S-tasks to illustrate task execution with a preferential order to pop tasks within and from outside the queue-scheduler-assignments. The figure is a combination of FIGS. 6-7, and is convenient to summarize the pop actions.

FIG. 9 is a flow chart diagram of the preferential order to pop tasks. It is convenient to look at FIG. 9 in combination with FIGS. 6-8.

As in operation 910 (cf. arrow F), suspended tasks are popped to core 101 for being resumed. This stays within the relation (assignment and related core). As in operation 920 (cf. arrow G), new tasks are popped to core 101 for execution. This also stays within the relation. As in operation 930 (cf. arrow H), new tasks are popped to core 101 for execution, but this happens outside the relation, in other words, the core steals tasks from another core (102). "Stealing" tasks refers to obtaining tasks from a queue not associated with the scheduler, and assigning the task for execution on the core associated with the stealing scheduler, rather than the core associated with the other queue and scheduler. As in operation 940 (cf. arrow I), suspended tasks are popped to core 101 for execution, but again outside the relation, in other words, the core steals tasks.

As in operation 950 (cf. arrow A), optionally, if new tasks are still in the initial queue 107, they are executed.

The figures illustrate by split symbols (diamonds) that the operations are executed if possible, and in the case that queues are empty, the operations can not be performed. The reference numbers indicate priority, with 910 having the highest priority. For example operation 920 is performed if operation 910 is not possible, or more general, operation "9v0+010" is executed if operation "9v0" (v=1, 2, 3, or 4) is not possible.

Figure 10A:
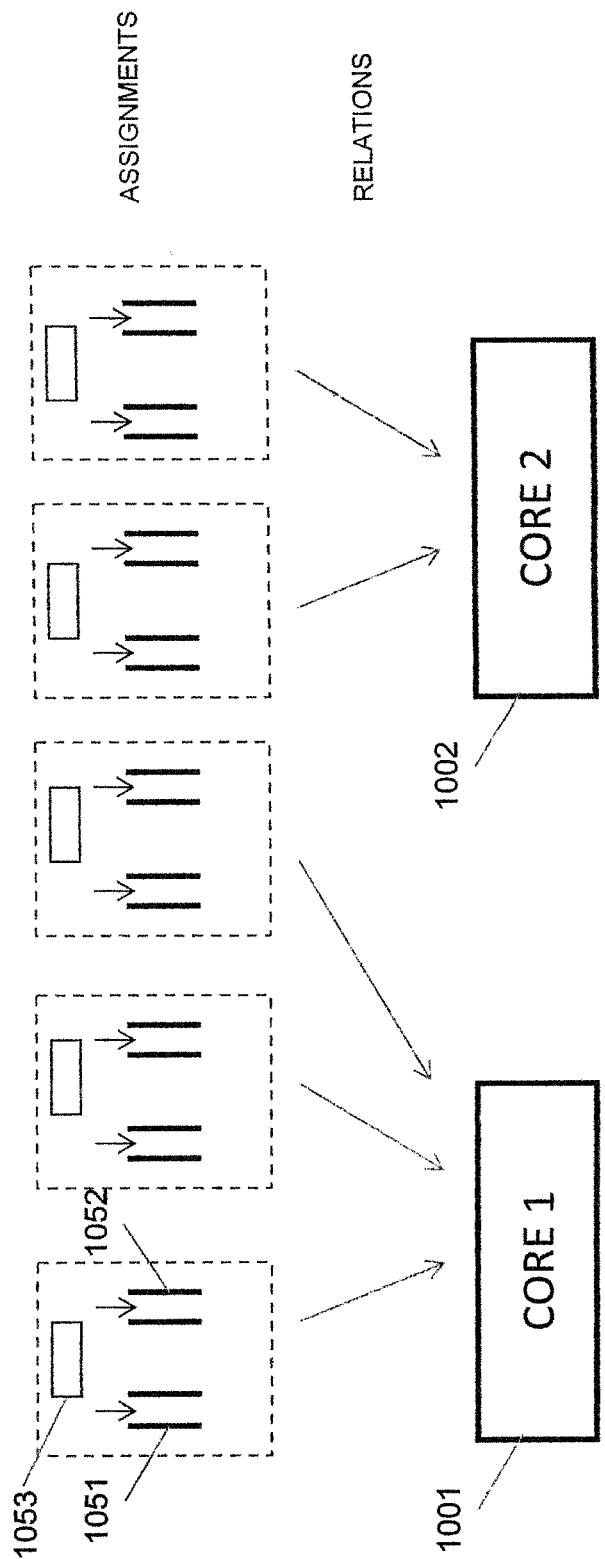
FIG. 10 is a block diagram of further embodiments.
Figure 10B:
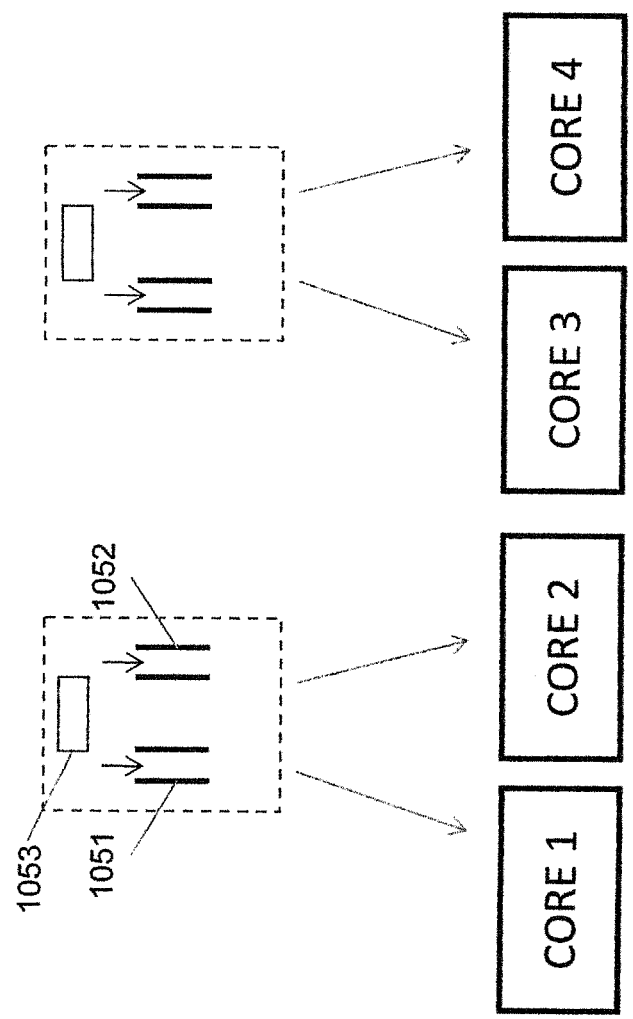
Figure 11:
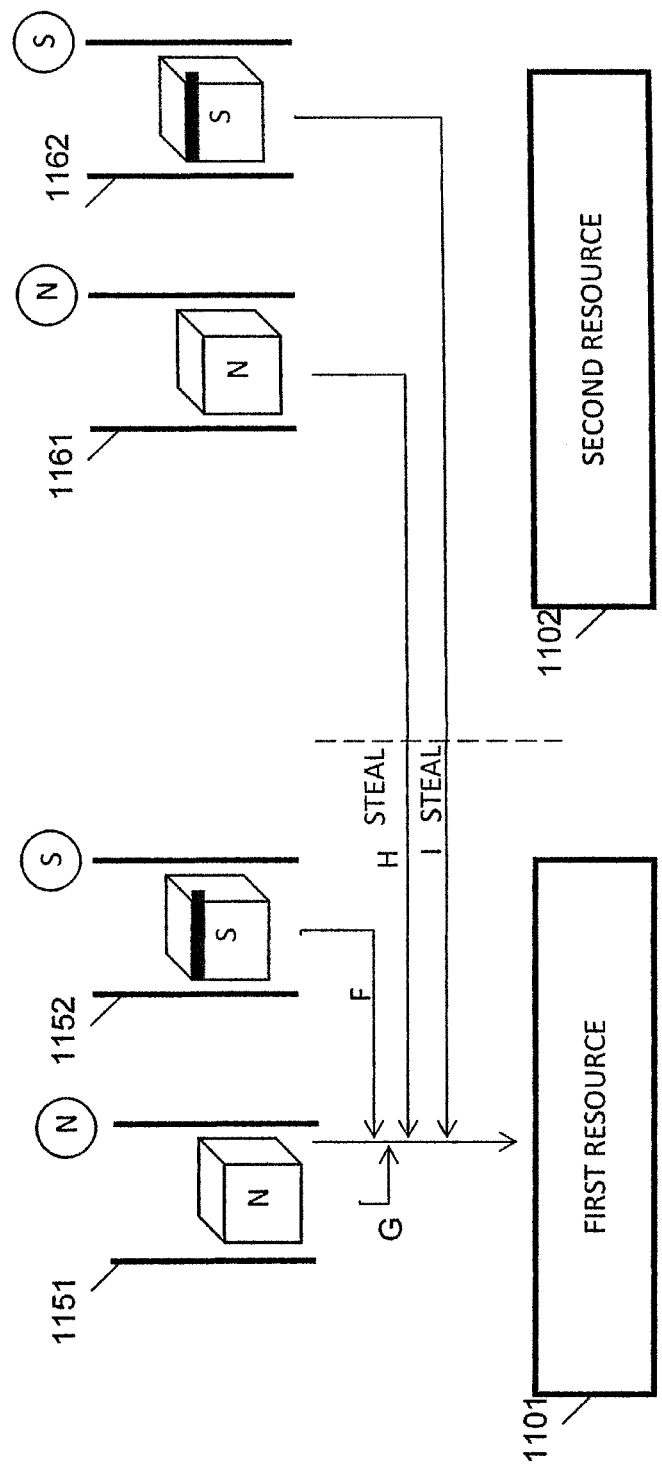
FIG. 11 is a block diagram of still further embodiments.

FIG. 10 is a block diagram of further embodiments with the number of scheduler instances and the number of cores being different. While embodiments had been explained with an equal number of scheduler instances (2) and cores (2 as well), FIG. 10 introduces embodiments with more queue-scheduler-assignments than cores (FIG. 10a) and embodiments with less queue-scheduler assignments then cores (FIG. 10b).

The figures illustrate the assignments in the upper part (with queues 1051/1052 and scheduler instances 1053) and the cores (e.g., 1001, 1002) in the lower part. Arrows indicate affinity relations.

For example, in FIG. 10a, the first, second and third assignments are related to the first core, and the fourth and fights assignments are related to the second core. For example, in FIG. 10b, the first assignment is related to the first and second cores, and the second assignment is related to the third and fourth cores. Other numbers are also convenient, for example, 4 scheduler instances and 2 cores, one scheduler, two cores, etc.

FIG. 11 is a block diagram of still further embodiments. The above algorithm has been explained for embodiments with processor cores. However, the task scheduling algorithm could also be applied to portions of application programs, web-services, virtual machines, etc., which run on processors. In FIG. 11, using similar references as in the other figures, in a computer system 1100 there are first 1101 and second 1102 resources (such as separate computer processors, or virtual computers), queues 1151, 1152, 1161, 1162, and tasks (N, S).

First queue 1151 (for tasks of a first type, e.g., new, N-type) and second queue 1152 (for tasks of a second type, e.g., suspended, S-type) are related to first resource 1101. Third queue 1161 (for tasks of the first type) and fourth queue 1162 (for tasks of the second type) are related to second resource 1102. The tasks have instructions, wherein the tasks of the first type have instructions that have not yet been executed by any of the resources and wherein the tasks of the second type have instructions for that some instructions have already been executed by any of the resources, as explained above.

A method for scheduling the execution of tasks by computer resources (1101, 1102), can comprise popping suspended tasks from second queue 1152 to first resource 1101 for executing the suspended tasks; popping new tasks from first queue 1151 to first resource 1101 for executing the new tasks; popping new tasks from third queue 1161 to first resource 1101 for executing the new tasks; and popping suspended tasks from fourth queue 1162 to first resource 1101 for executing the suspended tasks.

Looking at the second resource 1102, the method is applicable likewise: suspended tasks from queue 1162, new tasks from queue 1161 (own relation), and new tasks from queue 1151, suspended tasks from queue 1152 (other relation, "stealing").

While the majority of the description above refers to two cores or processors, it will be understood that more than two cores could be used. In the case of more than two cores, a core may need to select which of the multiple other cores it will steal a task from. The selection of the core from which task stealing occurs (such as in H and I of FIG. 1) could be performed either randomly or in accordance with a precomputed or preconfigured process. For example, a core could be configured with a preferred pattern to perform task stealing first from one core, then another, and so on. Alternatively, a core could be configured to steal from other cores based on core ID or some other criterion.

Variations of that arrangement and operation method are possible, without the need of further explanation herein. For example, the tasks could generate new tasks, for some tasks could be buffered in an initial queue.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

List of References

| | |
|---|---|
| (N) | N in circle: N-type queue |
| (S) | S in circle: S-type queue |
| Fib 0, Fib 1 etc. | Fibonacci numbers |
| 100 | computer |
| 101, 102 | cores |
| 151/152/153 | queue-scheduler-assignment |
| 161/162/163 | queue-scheduler-assignment |
| 103 | processor |
| 104 | RAM, random access memory |
| 105 | program |
| 153/163 | scheduler with first/second instances |
| 653/663 | scheduler with first/second instances |
| 753/763 | scheduler with first/second instances |
| 853/863 | scheduler with first/second instances |
| 107 | source queue |
| 110, 111 . . . 11K; X0, X1 . . . XK | K tasks in a group |
| 120, 121 . . . 12L; Y0, Y1 . . . YL | L tasks in a group |
| 151, 161 | queues N-type |
| 11x | first task group |
| 12y | second task group |
| 152, 162 | queues S-type |
| 200, 210, 220, 230, 240 | method |
| 300 | queue |
| 301 | queue input |
| 302 | queue output |
| 303 | push action |
| 304 | pop action |
| 310 | tasks |
| 311 | queue as LIFO |
| 312 | queue as FIFO |
| 313 | queue as DEQUE |
| 314 | queue as DCA |
| 400 | task |
| 401, 403 | new task, N-type task |
| 402, 404 | suspended task, S-type task |
| 505 | program |
| 510, 520 | example initial tasks |
| 511, 512, 521, 522, 523, 524, 525 | example new tasks |
| 601, 602 | cores |
| 651, 661 | queues N-type |
| 652, 662 | queues S-type |
| 701, 702 | cores |
| 751, 761 | queues N-type |
| 752, 762 | queues S-type |
| 801, 802 | cores |
| 851, 861 | queues N-type |
| 852, 862 | queues S-type |
| 900, 910, 920, 930, 940, 950 | method |
| 1051/1052/1053 | queue-scheduler-assignment |
| 1001, 1002 | core |
| 1100 | computer system |
| 1101, 1102 | resources |
| 1151, 1152, 1161, 1162 | queues |
| (A) (B) (C) (D) (E) (F) (G) (H) (I) | letters to explain exemplary order of push/pop actions |
| A, B, X . . . , Y . . . | tasks |

What is claimed is:

1. A method for scheduling execution of tasks by a multi-core processor, the method comprising:
popping tasks in a system in which a first queue for new tasks and a second queue for suspended tasks are related to a first core having an associated first scheduler, and a third queue for new tasks and a fourth queue for suspended tasks are related to a second core having an associated second scheduler, the tasks having instructions, the new tasks being tasks where none of the instructions have been executed by any of the cores, the suspended tasks being tasks where at least one of the instructions has been executed by any of the cores, including popping suspended tasks from the second queue with the first scheduler to the first core for the first core to execute the suspended tasks;

popping new tasks from the first queue with the first scheduler to the first core for the first core to execute the new tasks;

popping new tasks from the third queue with the second scheduler to the first core for the first core to execute the new tasks; and popping suspended tasks from the fourth queue with the second scheduler to the first core for the first core to execute the suspended tasks.

2. The method of claim 1, wherein popping new tasks is performed with a preference of initial tasks.

3. The method of claim 1, wherein popping a suspended task is performed with a preference of popping from the first and second queues that are related to the first core.

4. The method of claim 1, wherein the execution of a suspended task is resumed by the core that previously executed that at least one of the instructions of that suspended task.

5. The method of claim 1, performed by a multi-core processor wherein relations between queues and cores are affinity relations wherein execution resumption of suspended tasks has priority on the core that originally executed the tasks partly before suspension.

6. A method to operate a computer with a first processing core having an associated first scheduler and a second processing core having an associated second scheduler, the method comprising:

executing initial tasks by the cores;
preparing new tasks by the cores;
executing new tasks and suspended tasks by the cores, and selecting with the first and second schedulers new and suspended tasks for the cores to execute, wherein for the first processing core, the new and suspended tasks are removed by the schedulers from queues to be executed by the first processing core in a preference order that prioritizes the suspended tasks over new tasks from queues related to the first processing core, and that further prioritizes new tasks over suspended tasks from queues related to the second processing core.

7. The method of claim 6, wherein the selecting operation is performed with task affinity to the processing core that was executing a task prior to suspending it.

8. The method of claim 6, wherein queues related to the first processing core include tasks scheduled by an associated scheduler that only schedules the tasks in the queues associated with the first processing core, wherein queues related to the second processing core include tasks scheduled by an associated scheduler that only schedules the tasks in the queues associated with the second processing core, wherein a scheduler assigns tasks to its associated processing core from a non-associated queue if the associated queue does not have a task for the processing core to execute.

9. A method for scheduling execution of tasks by computer resources, the method comprising:

checking the availability of tasks in queues, wherein a first queue for tasks of a first type and a second queue for tasks of a second type are related to a first resource, wherein a third queue for tasks of the first type and a fourth queue for tasks of the second type are related to a second resource, the tasks having instructions, wherein the tasks of the first type have instructions that have not yet been executed by any of the resources and wherein the tasks of the second type have instructions for that some instructions have already been executed by any of the resources; and popping tasks to the first resource for execution by the first resource, in dependency of the availability to pop tasks of the second type from the first queue, to pop tasks of the first type from the first queue, to pop tasks of the first type from the third queue, and to pop tasks of the second type from the fourth queue.

10. The method of claim 9, wherein the tasks are popped in preference of tasks of the second type over the first type for tasks from the second and first queues, and in preference of tasks of the first type over the second type for tasks from the third and fourth queues, respectively.

11. A method for scheduling execution of tasks by computer resources, the method comprising:

a first operation, popping tasks to a first resource with a first scheduler associated with the first resource from first and second queues that are in relation to the first resource, with preference of suspended tasks over new tasks, wherein the first queue for tasks of a first type and the second queue for tasks of a second type are related to the first resource, and tasks of the first and second queues are scheduled for processing by the first resource, the tasks having instructions, wherein the tasks of the first type have only instructions that have not yet been executed a resource and wherein the tasks of the second type have at least one instruction that has already been executed by a resource;

a second operation, popping tasks to the first resource with a second scheduler associated with a second resource from a third and fourth queues that are not related to the first resource, with inverse preference of new tasks over suspended tasks, wherein the third queue for tasks of the first type and the fourth queue for tasks of the second type are related to a second resource, and tasks for the third and fourth queues are scheduled for processing by the second resource.

12. The method of claim 11, wherein the second operation is performed when the first and second queues in the relation to the first resource are empty.

13. An apparatus to execute tasks, the apparatus comprising:

first and second computational resources to execute the tasks;

a memory with queues wherein the first resource is related in a first relation to a first queue for new tasks and to a second queue for suspended tasks, and the second resource is related in a second relation to a third queue for new tasks and to a fourth queue for suspended tasks; and a scheduler to pop tasks from the queues for executing the tasks by the first and second resources, the scheduler to prioritize execution with suspended tasks having priority within the relations, and new tasks being allowed to be executed outside the relations, including to pop suspended tasks in the first relation from the second queue and new tasks in the first relation from the first queue for execution by the first resource;

pop suspended tasks from the second relation from the fourth queue and new tasks from the second relation from the third queue for execution by the first resource.

14. The apparatus of claim 13, wherein the scheduler pops tasks to the resources with priority levels, the first level being the highest priority level, wherein the first resource
- executes suspended tasks from the second queue in the first relation at a first priority level;
- executes new tasks from the first queue in the first relation at a second priority level;
- executes new tasks from the third queue by stealing tasks from the second relation at a third priority level; and
- executes suspended tasks from the fourth queue by stealing tasks from the second relation at a fourth priority level.

15. The apparatus of claim 13, wherein the computational resources are processing cores.

16. The apparatus of claim 13, wherein the scheduler has separate instances that are assigned to the queues and cores.

17. The apparatus of claim 13, wherein the computational resources are processor cores and wherein the tasks are threads.

18. A scheduler program being tangibly embodied as instructions stored on a non-transitory computer-readable storage medium, which when accessed, the scheduler program to cause a data processing system with multiple processing cores to:
- allow the cores to execute initial tasks;
- allow the cores to generate new tasks;
- execute new tasks and suspended tasks; and
- select, with a first scheduler associated with a first processing core and a second scheduler associated with a second processing core, new and suspended tasks for execution by the first processing core in response to the selecting, the new and suspended tasks to be executed in a preference order that prioritizes the suspended tasks over the new tasks from queues related to the first processing core, and that prioritizes new tasks over suspended tasks from queues related to the second processing core.

19. The scheduler program on the computer-readable storage medium of claim 18, the scheduler program to have separate instances for the relations to the cores.

* * * * *